F. DAVIS,

Assignor to H. B. IVES.

BOLT.

No. 9,901. Reissued Oct. 18, 1881.

Attest

Hiram A. Gray

Marion L. McDonald

Inventor:

Frank Davis by Geo. Terry Atty

N. PETERS, Photo-Lithographer, Washington, D. C.

UNITED STATES PATENT OFFICE.

FRANK DAVIS, OF NORTH ADAMS, MASSACHUSETTS, ASSIGNOR TO HOBART B. IVES, OF FAIR HAVEN, CONNECTICUT.

BOLT.

SPECIFICATION forming part of Reissued Letters Patent No. 9,901, dated October 18, 1881.

Original No. 202,158, dated April 9, 1878. Application for reissue filed April 1, 1881.

*To all whom it may concern :*

Be it known that I, FRANK DAVIS, of North Adams, in the county of Berkshire and State of Massachusetts, have invented certain new and useful Improvements in Door-Bolts, of which the following is a description.

The improvements are on the door-bolt for which Letters Patent were granted to me May 8, 1877.

The invention consists in combining a cylindrical outer case with an inner case, constructed and recessed as hereinafter described, said cases combining to inclose the operating mechanism, and to form a fulcrum and guide therefor; in combining with said cases a bolt, pitman, and crank; and in a pitman or connecting rod performing the functions of both pitman and spring, as the above are hereinafter more fully set forth and claimed.

Figure 1:
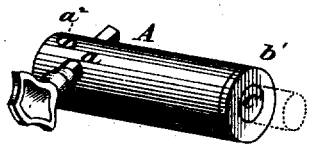
Figure 2:
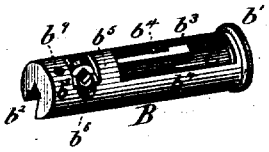
Figure 3:
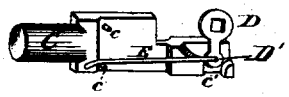
Figure 4:
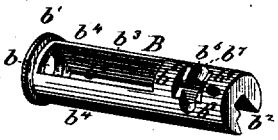

In the accompanying drawings, Figure 1 shows the bolt in perspective. Fig. 2 is a perspective view of the inner case and portions of some of the working parts. Fig. 3 is a view of the bolt, spring, and crank. Fig. 4 is a detail view of the inner case, and Fig. 5 is a detail view of the outer case.

To enable others to make and use my improvements in door-bolts, I will describe them in detail.

Figure 5:
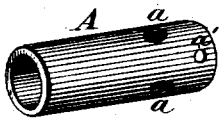

A, Figs. 1 and 5, is a cylindrical metallic outer case, having the holes *a a* near its rear end, and hole $a'$, through which a screw, $a^2$, Fig. 1, passes into the inner case, B, to hold the two cases together. The inner cylindrical case, B, Figs. 2 and 4, is made to fit closely into the outer case, and has on its front end a disk in which is the central opening, *b*. On its front end the flange $b'$ is formed, against which the outer case comes. A slot, $b^2$, Fig. 4, extends from the disk on the front end the whole length of the case. Another slot, $b^3$, opposite the slot $b^2$, extends backward from the end disk, as shown in Fig. 4. These slots leave the parts $b^4$ $b^4$ of the inner case, as shown in Fig. 4. A groove, $b^6$, extends across the case between the parts $b^5$ and $b^8$ of the case. A longitudinal slot, $b^7$, bisects this groove and is cut through the case.

C, Fig. 3, is the bolt, made with the lugs *c c*, only one of which is used. The projecting end is round, the part within the case is rectangular, one of the narrower sides fitting into the slot $b^2$ and the other into $b^3$. Its rear end is made narrower and thinner to make room for the crank, as shown in Fig. 3.

The crank D is made in the usual form, and is arranged in a position to bring the hole through its larger end in line with the groove $b^6$ on the inner case and with the openings *a a* in the outer case.

The pitman and spring E, Fig. 3, is a straight hard-drawn wire, and is connected to the bolt and crank by suitable pivotal connections. As shown in the drawings, its ends are bent at right angles to its length and pass into holes in the bolt and crank, the spring being made long enough for the purpose. The lug *c* on the bolt is so arranged relative to the connections of the spring as to give it the required degree of tension or "set up," as it is called. The tension bends the spring over the lug *c*, as shown in Fig. 3. The key has its shank square to fit the hole in the crank, with a round part near the handle to turn in the case, as shown in Fig. 1.

Having described my improved bolt and its mode of operation, what I claim as new, and desire to secure by Letters Patent, is—

1. The combination, with a door-bolt and operating mechanism, of a cylindrical exterior case and a recessed inner case, said cases combining to inclose the operating mechanism and to form a fulcrum and guide therefor, substantially as set forth.

2. The combination of case A, having opposite holes, *a a*, with inner case, B, having transverse groove $b^6$ and slot $b^7$, crank D, and the bolt and pitman, substantially as set forth.

3. The combination of the bolt C, provided with the lug *c*, pitman E, operating as a pitman and spring, and crank D to hold the bolt, substantially as set forth.

4. In a cylindrical door-bolt, the pitman E, arranged and adapted to operate as a pitman and spring, substantially as set forth.

FRANK DAVIS.

Witnesses:
MARTIN MCCORMICK,
CHAS. I. PARKHURST.